(12) United States Patent
Martinello

(10) Patent No.: US 10,230,911 B1
(45) Date of Patent: Mar. 12, 2019

(54) PREVIEW GENERATION FOR PLENOPTIC IMAGING SYSTEMS

(71) Applicant: Manuel Martinello, Mountain View, CA (US)

(72) Inventor: Manuel Martinello, Mountain View, CA (US)

(73) Assignee: RICOH COMPANY, LTD, Tokyo (JP)

(*) Notice: Subject to any disclaimer, the term of this patent is extended or adjusted under 35 U.S.C. 154(b) by 0 days.

(21) Appl. No.: 15/689,974

(22) Filed: Aug. 29, 2017

(51) Int. Cl.
H04N 5/345 (2011.01)
H04N 5/232 (2006.01)
H04N 5/357 (2011.01)
G06T 7/557 (2017.01)

(52) U.S. Cl.
CPC .......... H04N 5/3454 (2013.01); G06T 7/557 (2017.01); H04N 5/23216 (2013.01); H04N 5/23293 (2013.01); H04N 5/3572 (2013.01)

(58) Field of Classification Search
CPC ............ H04N 5/3454; H04N 5/23216; H04N 5/23293; H04N 5/3572; G06T 7/557
See application file for complete search history.

(56) References Cited

U.S. PATENT DOCUMENTS

| 8,811,769 B1 | 8/2014 | Pitts et al. | |
|---|---|---|---|
| 8,948,545 B2 | 2/2015 | Akeley et al. | |
| 9,386,288 B2 | 7/2016 | Akeley et al. | |
| 2013/0222652 A1* | 8/2013 | Akeley | H04N 9/045 348/241 |
| 2016/0029017 A1* | 1/2016 | Liang | H04N 5/2254 348/175 |
| 2016/0353007 A1* | 12/2016 | Sabater | H04N 5/2254 |
| 2017/0139131 A1* | 5/2017 | Karafin | H04N 5/23232 |
| 2017/0180702 A1* | 6/2017 | Boisson | H04N 13/204 |

OTHER PUBLICATIONS

U.S. Appl. No. 15/453,891, filed Mar. 8, 2017, Inventor: Aashish Kumar.

* cited by examiner

*Primary Examiner* — Nhan T Tran
(74) *Attorney, Agent, or Firm* — Fenwick & West LLP

(57) ABSTRACT

A plenoptic imaging system includes imaging optics, a microlens array and a sensor array. A method for generating a preview image of a plenoptic image captured by the plenoptic imaging system includes the following. A plenoptic image of an object captured by the plenoptic imaging system is accessed. The plenoptic image includes many superpixels. Each superpixel includes many subpixels. For each superpixel, a set of reliable subpixels is selected based at least in part on vignetting of the subpixels. A preview image is generated from the sets of reliable subpixels. The preview image includes pixels corresponding to the superpixels. The pixels in the preview image are generated from the set of reliable subpixels for the corresponding superpixels.

20 Claims, 8 Drawing Sheets

PREVIEW GENERATION FOR PLENOPTIC IMAGING SYSTEMS

BACKGROUND

1. Technical Field

This disclosure relates generally to preview generation for plenoptic imaging systems.

2. Description of the Related Art

Color plenoptic imaging systems have recently received increased attention. They can be used to recalculate a different focus point or point of view of an object in full color, based on digital processing of the captured plenoptic image. The color plenoptic imaging system also finds application in estimating depth to three-dimensional objects that are imaged by the plenoptic imaging system, possibly followed by three-dimensional reconstruction of those objects or the entire three-dimensional scene.

However, the amount of image processing required to generate the final processed images from the raw plenoptic images can be significant and often cannot be done at video rates in real-time. However, without the processed images, it can be difficult for the plenoptic camera user to know where the camera is pointed and what images are being captured.

Thus, there is a need for preview generation for plenoptic imaging systems, including for systems that capture plenoptic color video.

SUMMARY

In one aspect, a plenoptic imaging system includes imaging optics, a microlens array and a sensor array. A method for generating a preview image of a plenoptic image captured by the plenoptic imaging system includes the following. A plenoptic image of an object captured by the plenoptic imaging system is accessed. The plenoptic image includes many superpixels. Each superpixel includes many subpixels. For each superpixel, a set of reliable subpixels is selected based at least in part on vignetting of the subpixels. A preview image is generated from the sets of reliable subpixels. The preview image includes pixels corresponding to the superpixels. The pixels in the preview image are generated from the set of reliable subpixels for the corresponding superpixels.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
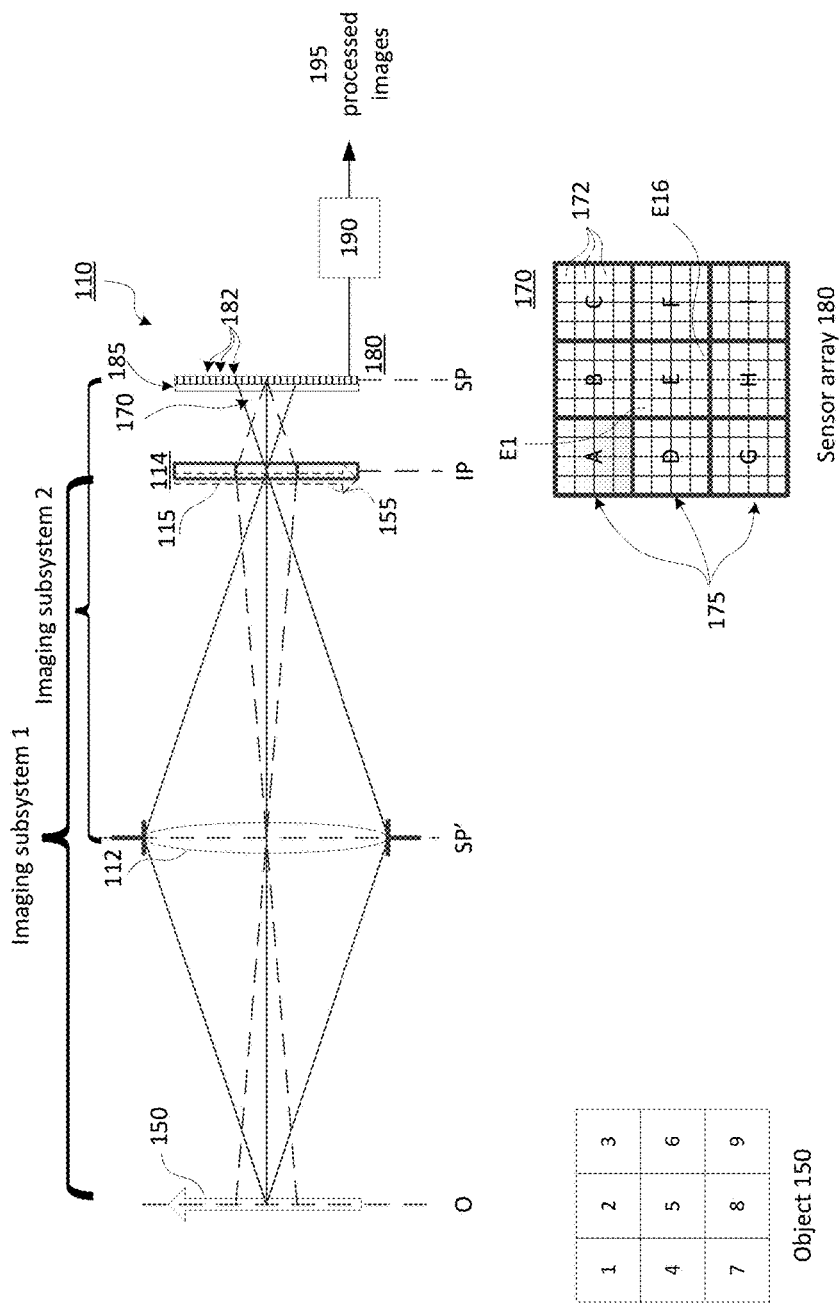
FIG. 1 is a diagram of a plenoptic imaging system, according to one example embodiment.

FIG. 1 is a diagram illustrating a plenoptic imaging system. The plenoptic imaging system 110 includes imaging optics 112 (represented by a single lens in FIG. 1), a microlens array 114 (an array of microlenses 115) and a sensor array 180. The microlens array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microlens array 114 is located at the image plane IP, and each microlens images the aperture of imaging subsystem 1 onto the sensor array 180. The aperture may be considered the pupil of imaging subsystem 1. That is, the sensor array and aperture are located at conjugate planes SP (i.e., the sensor plane) and SP' (conjugate of the sensor plane). The microlens array 114 can be a rectangular array, hexagonal array or other types of arrays. The sensor array 180 is also shown in FIG. 1.

The sensor array 180 includes sensors 182, which can be color sensors, for example arrays of red, green and blue color sensors arranged in a Bayer pattern. In some embodiments, this is achieved by use of a color filter array 185. In one example embodiment, the color filter array 185 includes red, green and blue microfilters, one per sensor, arranged in a Bayer pattern. The Bayer pattern has twice as many green elements as either red or blue. As a result, the sensor array 180 captures red, green and blue color channels.

The bottom portion of FIG. 1 provides more detail. In this example, the microlens array 114 is a 3×3 array of microlenses 115. The object 150 is divided into a corresponding 3×3 array of regions, which are labeled 1-9. Each of the regions 1-9 is imaged by the imaging optics 112 and imaging subsystem 1 onto one of the microlenses 114. The dashed rays in FIG. 1 show imaging of region 5 onto the corresponding center microlens.

Each microlens 115 images these rays onto a corresponding section of the sensor array 180. The sensor array 180 is shown as a 12×12 rectangular array. FIG. 1 also shows the plenoptic image 170 captured by the sensor array 180, which can be subdivided into superpixels 175, labelled A-I, with each superpixel corresponding to one of the microlenses and therefore also corresponding to a certain region of the object 150. In FIG. 1, superpixel E corresponds to the center microlens, which corresponds to region 5 of the object. That is, the sensors within superpixel E capture light from region 5 of the object.

Each superpixel contains many individual subpixels 172. Generally each subpixel corresponds to a sensor of the sensor array. In this example, the plenoptic image has a 3×3 array of superpixels, and each superpixel 175 has a 4×4 array of individual subpixels 172. Each subpixel within a superpixel captures light from the same region of the object, but at different propagation angles. For example, the upper left subpixel E1 in superpixel E captures light from region 5, as does the lower right subpixel E16 in superpixel E. However, the two subpixels capture light propagating in different directions from the object. This can be seen from the solid rays in FIG. 1. All three solid rays originate from the same object point but are captured by different subpixels within the same superpixel. That is because each solid ray propagates along a different direction from the object.

In other words, the object 150 generates a four-dimensional light field $L(x,y,u,v)$, where L is the amplitude, intensity or other measure of a ray originating from spatial location $(x,y)$ propagating in direction $(u,v)$. Each subpixel 172 captures light from a certain volume of the four-dimensional light field. The subpixels are sampling the four-dimensional light field. The shape or boundary of such volume is determined by the characteristics of the plenoptic imaging system.

In certain plenoptic imaging system designs, the sample volumes are hyperrectangles. That is, every subpixel within a superpixel captures light from the same rectangular $(x,y)$ region associated with the superpixel 175, and each subpixel 172 within the superpixel captures light from a different rectangular $(u,v)$ region. However, this is not always the case. For convenience, the superpixels will be described as capturing light from a certain region of the object 150 (even though subpixels within that superpixel may capture light from slightly different regions), and the subpixels will be described as capturing light from a certain range of propagation directions (even though the range may be different for different subpixels, or even for different $(x, y)$ points captured by the same subpixel). Regardless of the details, the plenoptic imaging system creates a plenoptic image 170, which maps $(x,y)$ spatial locations and $(u,v)$ propagation directions to subpixels. This is in contrast to a conventional image, which maps $(x,y)$ spatial locations to pixels but loses information about the $(u,v)$ propagation directions.

The superpixel is the aggregate of all subpixels that have the same light field viewing region. The view is an analogous concept for propagation direction. The view is the aggregate of all subpixels that have the same light field viewing direction. In the example of FIG. 1, the individual subpixels A1, B1, C1, . . . I1 make up the upper left view of the object. The individual subpixels A16, B16, C16, . . . I16 make up the lower right view of the object. The center view is the view that corresponds to $(u,v)=(0,0)$, assuming that the plenoptic imaging system is an on-axis symmetric system. The centroid of each superpixel is the point in the superpixel that corresponds to $(u,v)=(0,0)$, and the center subpixel is the subpixel that contains that point.

Because the plenoptic image 170 contains information about the four-dimensional light field produced by the object, the processing module 190 can be used to perform different types of analysis, such as depth estimation, three-dimensional reconstruction, synthetic refocusing, extending the depth of focus, spectral analysis and other types of multi-view analysis.

Figure 2:
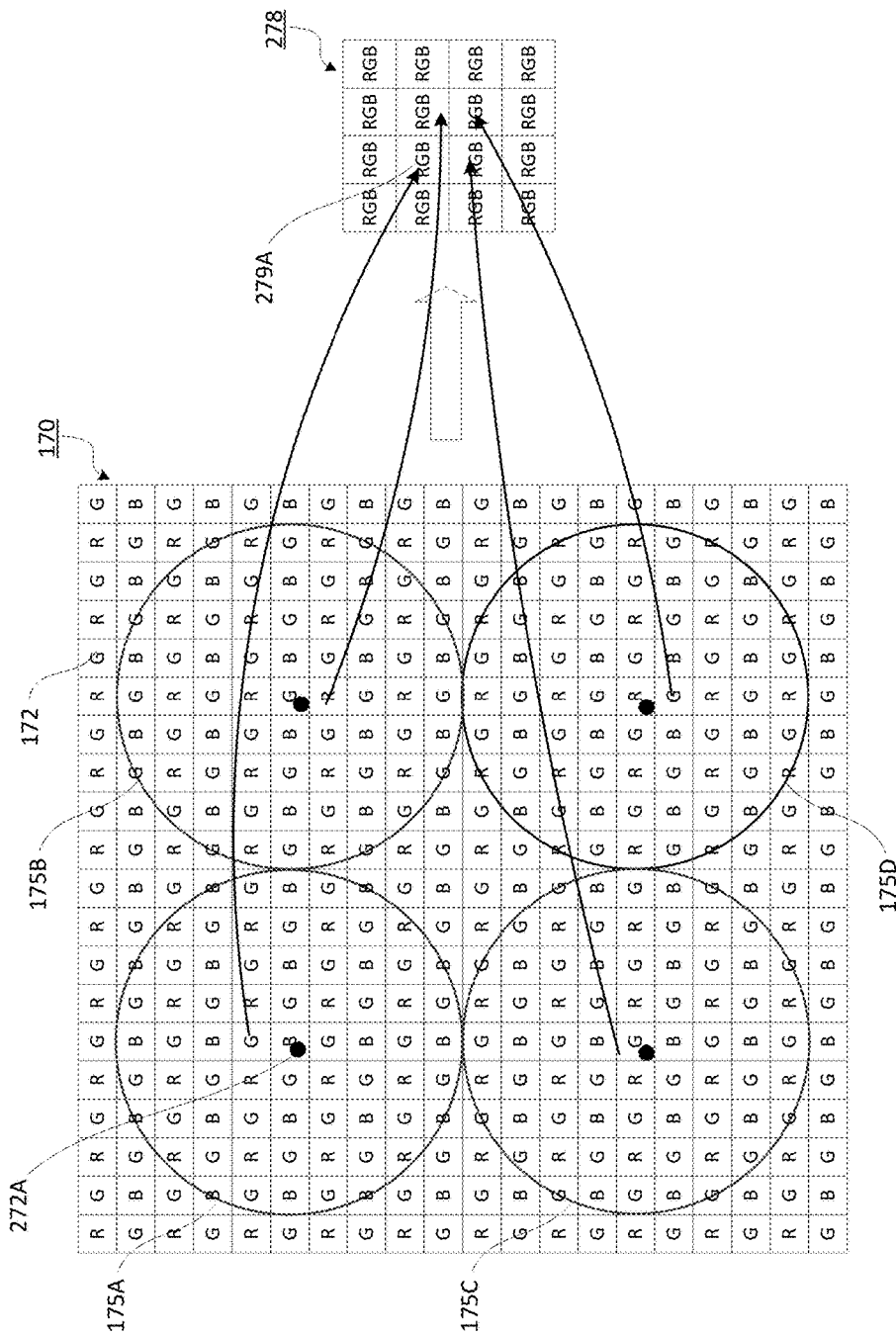
FIG. 2 is a diagram illustrating generation of a preview image, according to one example embodiment.

In many cases, it is useful to generate a preview image of what the plenoptic image is capturing. FIG. 2 is a diagram illustrating generation of a preview image 278 from a plenoptic image 170, according to one example embodiment. The left-hand side of FIG. 2 shows a portion of a plenoptic image 170 that contains a 2×2 array of superpixels 175A-D. The full plenoptic image will be much larger and contain many more superpixels. In FIG. 2, these superpixels 175 are largely round, as opposed to the square superpixels shown in FIG. 1, because the pupil for the primary optics 112 is round. Additionally, these superpixels 175 are square packed because the microlens array 114 is a square array. In other embodiments, the superpixels can have different shapes and the array of superpixels can take any other packing structure (e.g. rectangular or hexagonal). Each small square is a subpixel 172 of the plenoptic image. In this example, a Bayer filter is used so the subpixels 172 are red, green or blue color subpixels, as denoted by the R, G or B in each square.

In FIG. 2, the centroid of each superpixel 175A-D is marked by a "•", and the center subpixel 272A-D is the subpixel with the "•". For clarity, only center subpixel 272A is labelled in FIG. 2. The center subpixel 272 of each superpixel 175 is the subpixel that corresponds to the center view of the plenoptic image. The centroids can be determined using a signal power analysis, a geometric analysis, or spectral analysis of each superpixel, for example.

The right-hand side of FIG. 2 shows the preview image 278 generated from the plenoptic image 170. The preview image 278 includes pixels, which are denoted by boxes in FIG. 2. For clarity, only pixel 279A is marked in FIG. 2. In this example, there is one pixel 279 in the preview image 278 for each superpixel 175 in the plenoptic image, as denoted by the arrows in FIG. 2. Pixel 279A corresponds to superpixel 175A, and so on. In this case, the preview image 278 is color, so each pixel 279 includes different color components.

The pixels 279 are generated from the subpixels 172 in the corresponding superpixel 175. That is, color pixel 279A is generated from the subpixels 172 of superpixel 175A. Typically, the red component of color pixel 279A is generated from the red subpixels of superpixel 175A, the green component from the green subpixels and the blue component from the blue subpixels. Alternate approaches can also be used.

Figure 3:
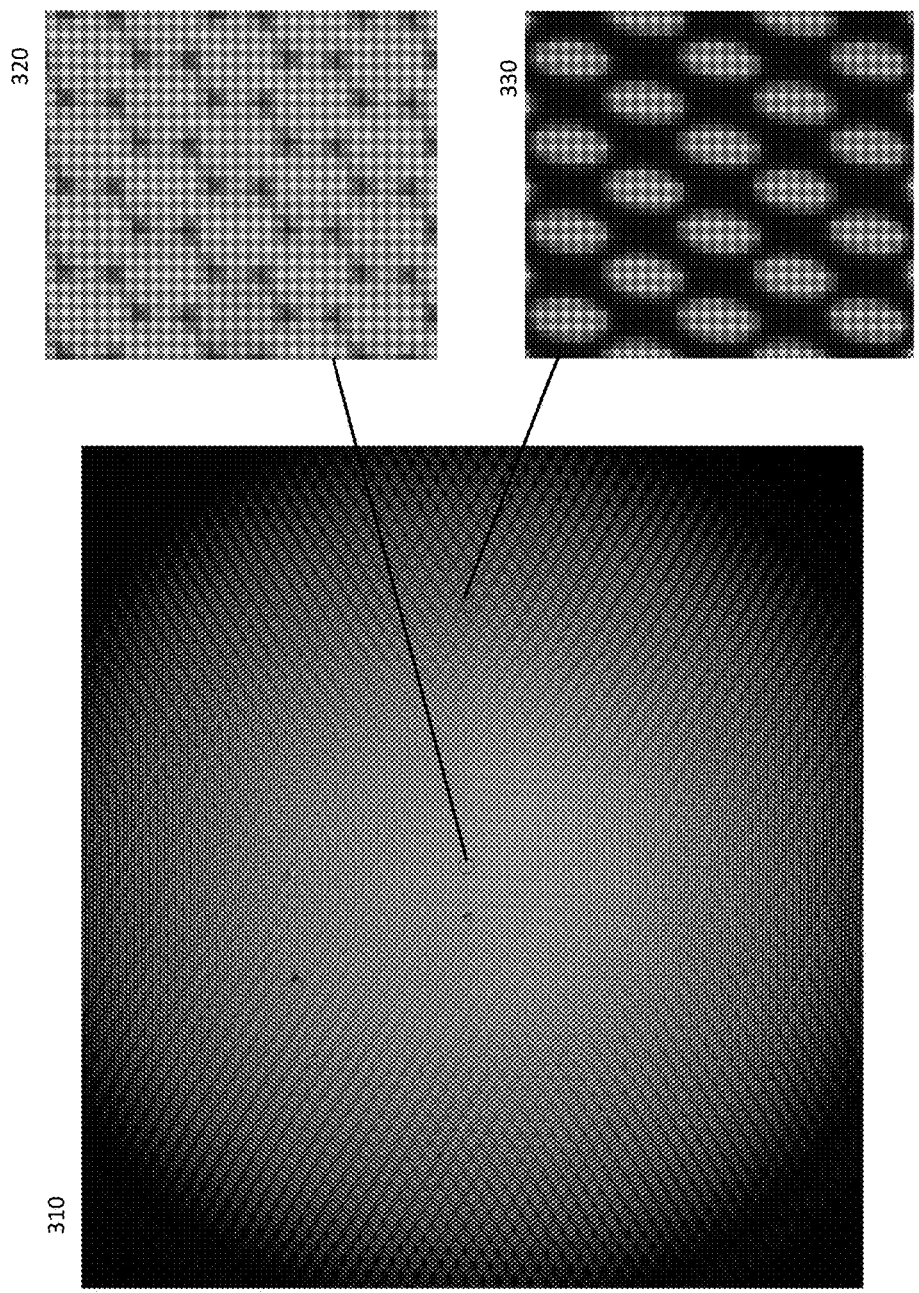
FIG. 3 is a plenoptic image that illustrates the effects of vignetting, according to one example embodiment.

However, not all subpixels within a superpixel are equally "reliable." For example, vignetting causes a degradation in the quality of subpixels. FIG. 3 is a plenoptic image that shows the effects of vignetting. The main image in FIG. 3 is a plenoptic image 310. FIG. 3 contains two close-ups of the plenoptic image. Close-up 320 shows a center region of the plenoptic image. Close-up 330 shows an edge region of the plenoptic image. In both of these close-ups, the hexagonal array of superpixels 175 is visible and, within each superpixel, the individual subpixels 172 are also visible as a checkboard pattern. Importantly, the superpixels on the edge 330 are smaller and oval-shaped compared to the larger, rounder superpixels in the center 320. In the center 320, it may be feasible to use all subpixels that fall within the round footprint of the superpixel. However, if those same subpixels were used on the edge 330, it would include a fair number of subpixels that have been vignetted (i.e., that are "unreliable") and would yield a poor result.

Figure 4:
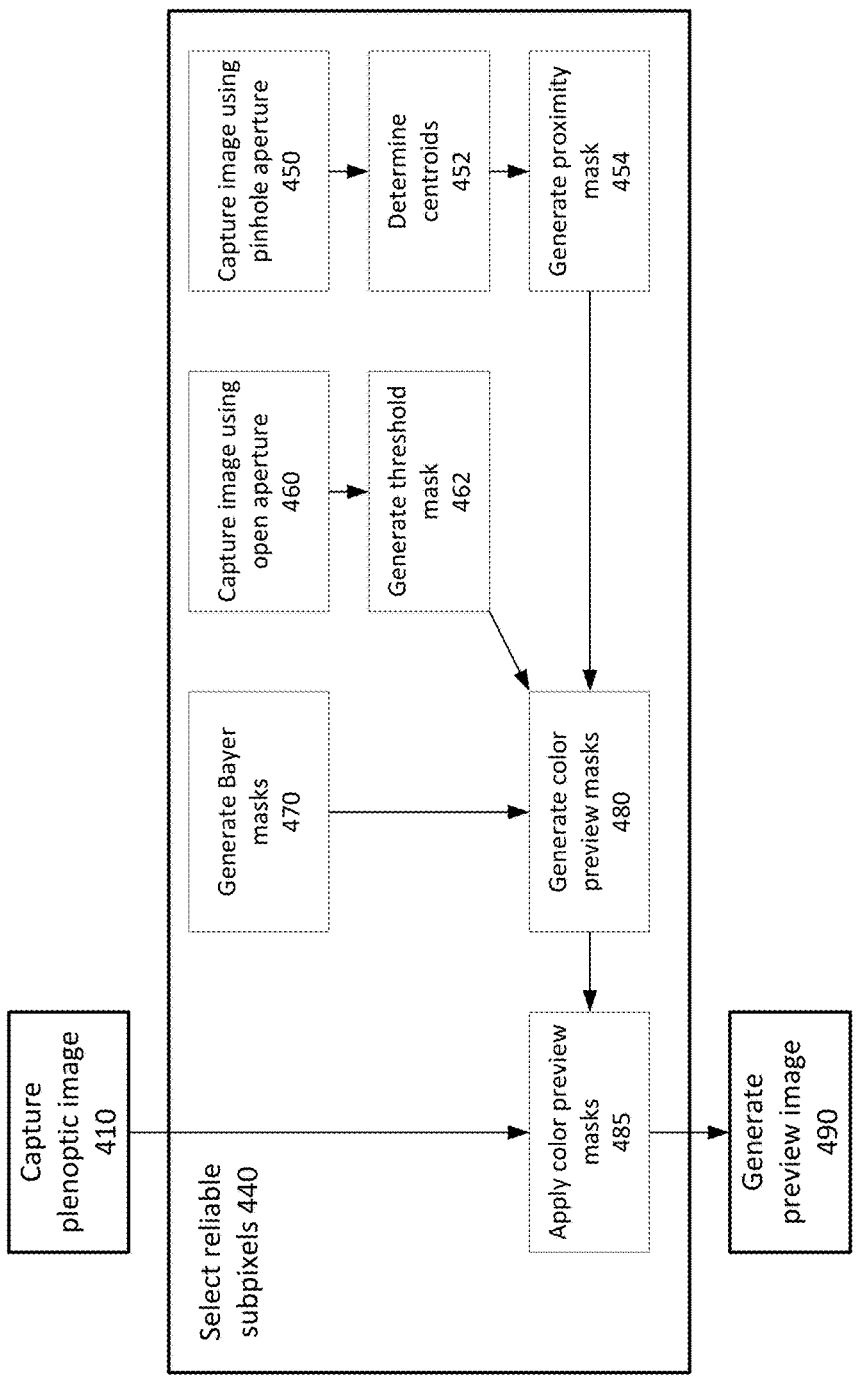
FIG. 4 is a flow diagram of one method for generating a preview image, according to one example embodiment.

Accordingly, FIG. 4 is a flow diagram of one method for generating preview images, according to one example embodiment. In the example described below, the process is performed by the plenoptic imaging system. In another embodiment, the process is performed by a computing system separate from the plenoptic imaging system. Other modules may perform some or all of the steps of the process in other embodiments. Likewise, embodiments may include different and/or additional steps, or perform the steps in different orders.

In FIG. 4, the plenoptic imaging system captures 410 a plenoptic image 170 of an object of interest. In alternate embodiments, the plenoptic image may have been previously captured. As described above, not all subpixels in a plenoptic image are equally reliable, for example due to vignetting. The processing module 190 selects 440 the reliable subpixels based at least in part on vignetting. Preferably, this is done for each superpixel because the set of reliable subpixels is different for different superpixels. As shown in FIG. 3, the center superpixels suffer from less vignetting and therefore typically have more reliable subpixels compared to the edge superpixels. The preview image 278 is generated 490 from the reliable subpixels. For example, it may be a weighted average of the reliable subpixels. In FIG. 2, there is one color pixel 279 in the preview image for each superpixel. The color components for that color pixel 279A are generated from the reliable subpixels in the corresponding superpixel 175A. The red reliable subpixels generate the red component, and so on.

FIG. 4 shows an example approach for step 440 that is based on masking 485 the subpixels. This particular implementation uses three masks: a proximity mask 454, a threshold mask 462 and a set of Bayer masks 470 (one for each color component). These three masks are combined to generate 480 a set of color preview masks, one for each color component, which are applied 485 to the subpixels to mask out unreliable subpixels. Each of these masks is described in more detail below.

The proximity mask 454 is a mask that identifies the set of subpixels that preferably would be used to generate the preview if they were all reliable. FIG. 4 shows one way to generate 454 the proximity mask, based on a calibration procedure using a pinhole aperture. The object preferably is a uniform white target, although this is not required. In this approach, the aperture for imaging subsystem 1 is stopped down, preferably to a pinhole. This effectively produces a point object for each of the microlenses in imaging subsystem 2. The plenoptic imaging system captures 450 a plenoptic image of the object using the pinhole aperture. The pinhole aperture reduces the light entering the main imaging optics 112 such that, ideally, only light propagating in the (0,0) direction enters the main imaging optics.

Accordingly, in the superpixel under each microlens, only the location corresponding to the (0,0) direction will be illuminated. That is, the pinhole aperture acts as a point object for each microlens, which results in a point image that marks the centroid of each superpixel. This is used to determine 452 the centroid locations for each superpixel. This is one way to determine the centroids, but the centroids can also be determined using other approaches, for example based on a signal power analysis, a geometric analysis, or spectral analysis of each superpixel, for example.

The processing module generates 454 a mask based on the centroid locations. For convenience, this mask will be referred to as a proximity mask. The proximity mask is defined by a window positioned relative to the centroid of each superpixel. The proximity mask corresponds to a synthetic lens aperture that can be used to generate the preview image. A large proximity mask generates a preview image with a shallow depth of field and large vignetting effects, while a small proximity mask generates a preview image with large depth of field and small vignetting effects. In one approach, the window is symmetric and centered at the centroid of each superpixel. If the window is rectangular, then the proximity mask can be defined as $$M_P(i,j) = \begin{cases} 1 & \text{if } (|i - x_c| \leq S \wedge (|j - y_c| \leq T)) \text{ for any } (x_c, y_c) \in C \\ 0 & \text{otherwise} \end{cases} \quad (1)$$

where $M_p(i,j)$ is the proximity mask value at a subpixel location $(i,j)$, S and T define the rectangular window, and the set C contains the locations of the centroids $(x_c, y_c)$ where c is an index for the superpixels. In this example, the window is the same for all superpixels, although that is not required. For example, the proximity mask might be different for different superpixels if we want to keep the amount of light after all masks approximately equal between the center and edge superpixels. For edge superpixels, more subpixels will be discarded by the threshold mask 462 due to vignetting. In that case, the proximity mask is made larger for edge superpixels so that, after the effect of vignetting, the remaining subpixels is approximately the same between the center and edge superpixels.

Figure 5A:
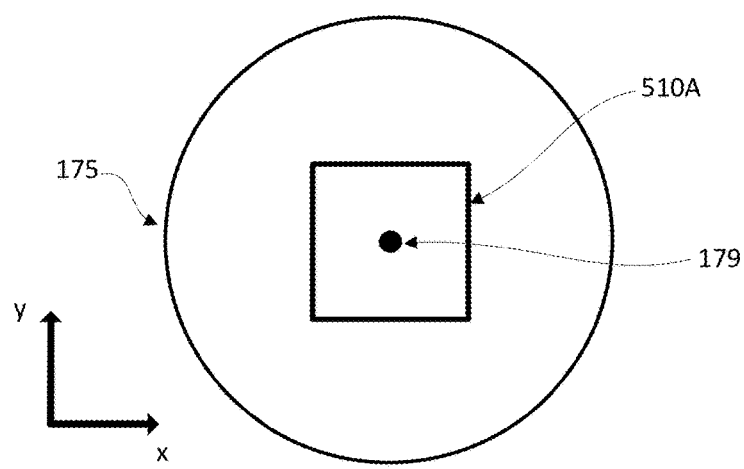
FIGS. 5A-5C illustrate various proximity masks, according to different example embodiments.
Figure 5B:
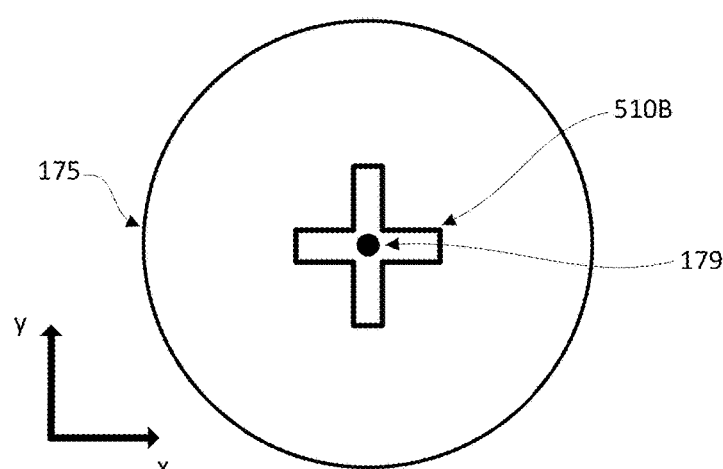
Figure 5C:
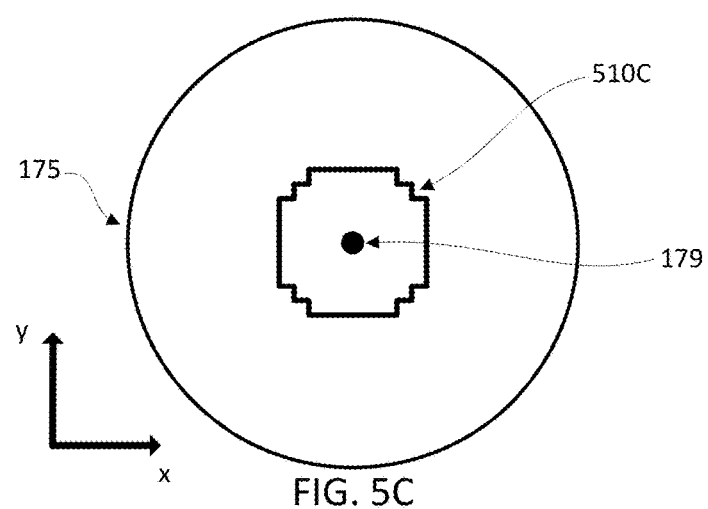

FIGS. 5A-5C illustrate examples of different shaped windows. In these figures, the centroid 179 of each superpixel 175 is marked by a "•". In FIG. 5A, the window 510A is a square shape centered on the centroid 179. In FIG. 5B, the window 510B is a cross shape centered on the centroid 179, extending in the x and y directions. In FIG. 5C, the window 510C include all subpixels within a radial distance from the centroid 179. There can be many other shapes and sizes of windows. In one particular embodiment, the window is a 3×3 array of subpixels centered about the centroid. In some embodiments, the user of the plenoptic imaging system can adjust the size and shape of the window for the proximity mask.

Now consider the threshold mask 462. The threshold mask 462 is a mask that masks out those subpixels that are not reliable because their signal strength is too low. For example, some subpixels may be vignetted even under ideal conditions. In other cases, subpixels may be below the threshold because they are vignetted, damaged, or occluded by dust on the microlenses. In addition, the plenoptic imaging system may degrade over time or images may be captured under less than ideal conditions. This can also lead to noisy or otherwise unreliable subpixels.

FIG. 4 shows one way to generate 462 the threshold mask, based on a procedure using a fully open aperture for the imaging subsystem 1. The plenoptic imaging system captures 460 a plenoptic image using a fully open aperture. If this is done as part of a calibration process, then the object preferably is a uniform white target. The processing module 190 generates 462 a threshold mask based on the captured plenoptic image. In one approach, this is done by thresholding. The threshold mask can be defined as $$M_T(i,j) = \begin{cases} 1 & \text{if } L(i,j) > T \\ 0 & \text{otherwise} \end{cases} \quad (2)$$

where $M_T(i,j)$ is the threshold mask value at a subpixel location $(i,j)$, T defines the threshold value, and $L(i,j)$ is the value of subpixel $(i,j)$. In one approach, a different threshold T is used for each color channel. In a different approach, the image is first color balanced and then the same threshold T is used for all color channels.

Figure 6A:
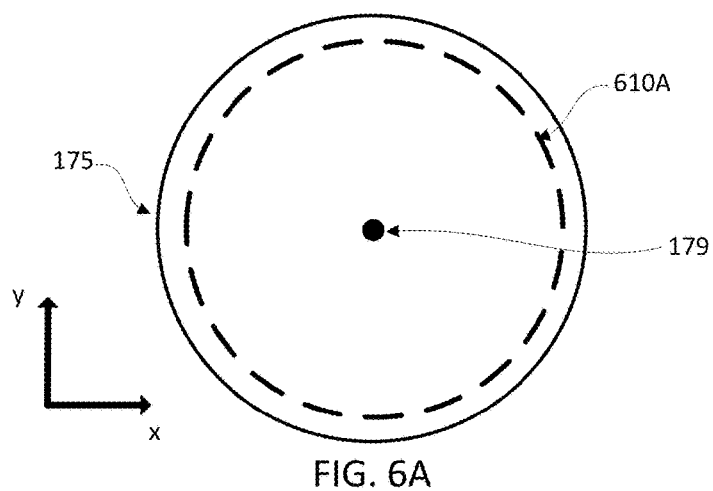
FIGS. 6A-6D illustrate various threshold masks, according to different example embodiments.
Figure 6B:
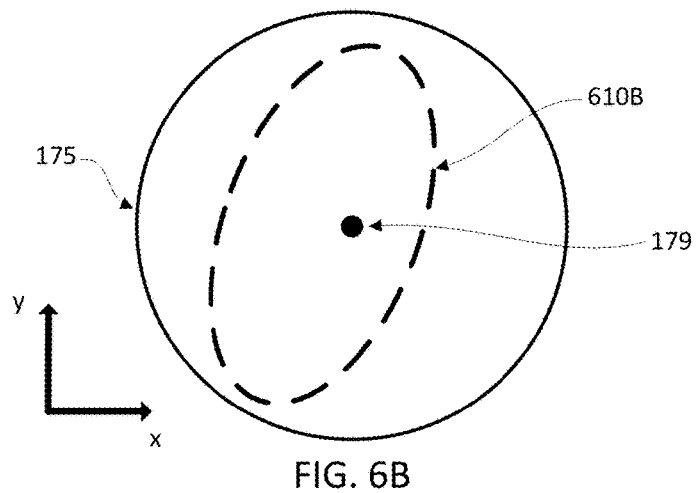

FIGS. 6A-6D illustrate examples of threshold masks for different superpixels. In these figures, the centroid 179 of each superpixel 175 is marked by a "•". FIG. 6A roughly corresponds to the center superpixels 320 shown in FIG. 3, and FIG. 6B roughly corresponds to the edge superpixels 330. In these figures, the dashed line 610 is the boundary between subpixels that are above the threshold and those that are below threshold. The threshold mask will be 1 for subpixels inside the boundary and 0 otherwise. In FIG. 6A, the threshold mask 610A is a large round shape centered on the centroid 179. In FIG. 6B, the threshold mask 610B is a smaller oval shape that is offset from the centroid 179.

Figure 6C:
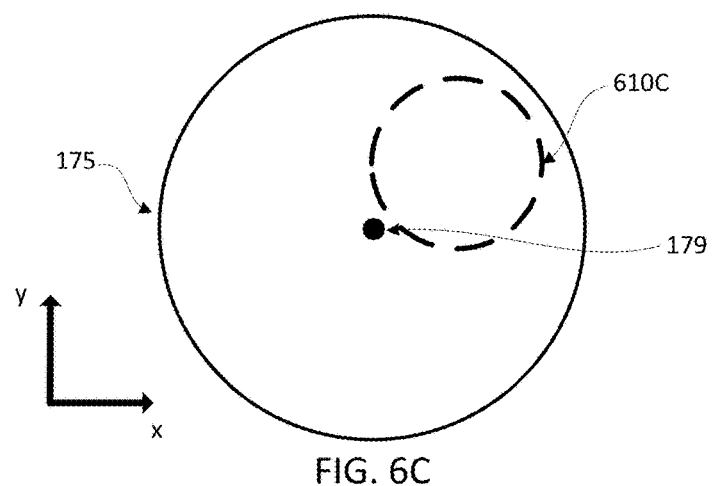
Figure 6D:
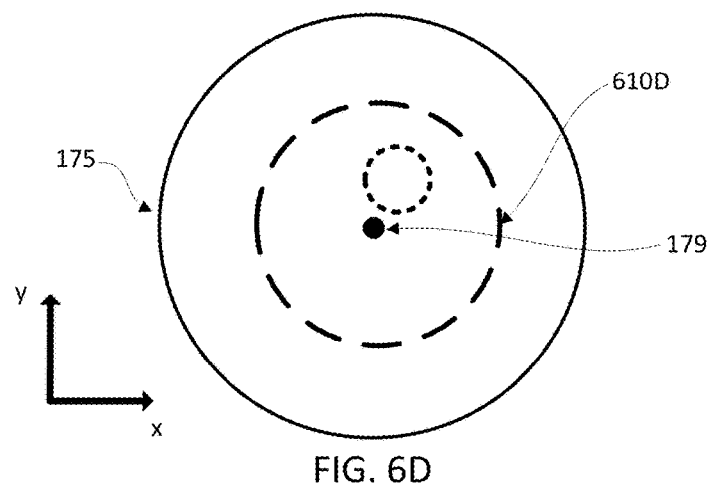

There can be many other shapes and sizes, for example masks that do not include the centroid and masks that are substantially smaller than the superpixel, as shown by the mask 610C in FIG. 6C. In other examples, the masks are not convex or can even be disjoint as shown in FIG. 6D. In FIG. 6D, the mask 610D includes the subpixels inside the larger dashed circle but outside the smaller dashed circle. For example, the subpixels inside the smaller dashed circle may be subpixels that are below the threshold, which are surrounded by a number of subpixels that are above the threshold. In some embodiments, the threshold value can be adjusted by the user of the plenoptic imaging system.

Referring to FIG. 4, if the images are color, then color masks may also be generated 470. In the case of a Bayer pattern, there may be red, green and blue masks that are used to select the red, green and blue subpixels of the plenoptic image. The color masks can be defined as $$M_B(i, j, l) = \begin{cases} 1 & \text{if subpixel } (i, j) \text{ is color } l \\ 0 & \text{otherwise} \end{cases} \quad (3)$$

where $M_B(i,j,l)$ is the Bayer pattern mask value at a subpixel location $(i,j)$ for color $l$, where $l$ is an index for the different color components. The green Bayer mask will be approximately half 1's and half 0's, because half the subpixels are green in the Bayer pattern. The red and blue masks will have approximately one quarter 1's.

An aggregate mask can be generated 480 by multiplying together the different component masks. In the case of binary masks, this can be implemented by using a logical AND. The resulting set of masks, which shall be referred to as color preview masks, is given by $$M_V(i,j,l) = M_P(i,j) \cdot M_T(i,j) \cdot M_B(i,j,l) \quad (4)$$

where $M_P$ is the proximity mask, $M_T$ is the threshold mask, and $M_B$ is the Bayer color mask. $(i,j)$ are the indices for the subpixels, and $l$ is the index for the different color components.

Figure 7A:
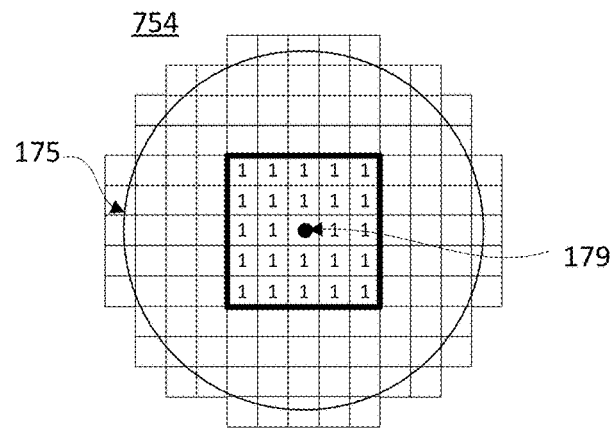
FIGS. 7A-7C illustrate the generation of a preview mask, according to one example embodiment.
Figure 7B:
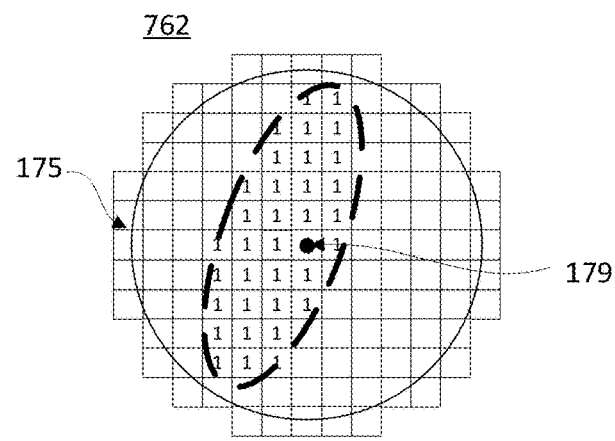
Figure 7C:
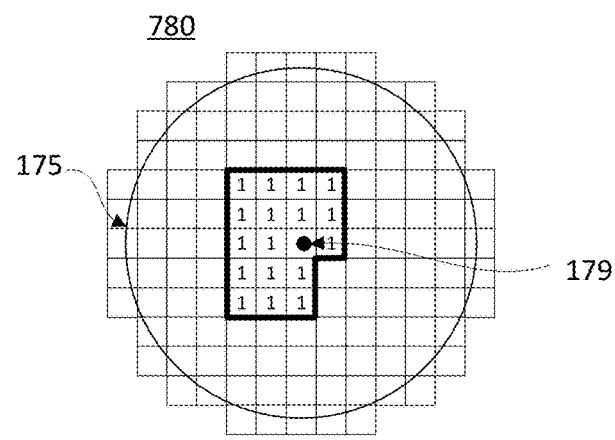

As an example, FIGS. 7A-7C are a series of diagrams illustrating the generation 480 of a preview mask from a proximity mask and threshold mask, according to one example embodiment. This is a monochrome example so there are no color components and all subpixels are the same color. This example shows only one superpixel 175, which is on the edge of the plenoptic image. Each square represents a subpixel within the superpixel. FIG. 7A shows a proximity mask 754 similar to that of FIG. 5A. The superpixel 175 has a diameter of 13 subpixels, and the proximity mask 754 is a 5×5 square window centered on the centroid 179, as indicated by the 1's. The mask values are 0 for all other subpixels. FIG. 7B is a diagram of a threshold mask 762 similar to that of FIG. 6B. Since this is an edge superpixel, there is a fair amount of vignetting. FIG. 7C is a preview mask 780 that is the scalar product of the proximity mask 754 and the threshold mask 762. The reliable subpixels are bordered by a black line. The preview mask values 780 are similarly generated for the other superpixels.

The preview mask 780, whether monochrome or color, defines the set of reliable subpixels, which are then used to generate the preview image. In one approach, the preview image is generated by calculating a center view for each color channel. As an example of one color channel, to calculate the green center view, the processing module first applies the green preview mask to the captured plenoptic image. One approach includes the scalar multiplication of the green preview mask and the plenoptic image. That is, $$I_M(i,j,l_g) = I(i,j) \cdot M_V(i,j,l_g) \quad (5)$$

where $I(x,y)$ is the captured plenoptic image, $M_V(i,j,l_g)$ is the green preview mask, and $I_M(I,j)$ is the masked image.

Applying the color preview mask to the raw plenoptic image reduces the structure of the raw image such that only reliable subpixels (of a certain color) remain to generate preview images. For example, the reliable subpixels are a specific type of subpixel, e.g. green subpixels with a pixel value above the threshold T which have a pixel location within the specified window about each centroid. Thus, the masked image includes the pixel values for that type of pixel while the pixel values for all other types of pixels have been masked out.

Using the masked image, the processing module can generate a preview image. In one embodiment, the processing module determines the green component of the pixels in the preview image by using a weighted average of the reliable subpixels in each superpixel. That is, if a superpixel has three reliable green subpixels, then a weighted average of those yields the green component in the preview image for the pixel corresponding to that superpixel. The processing module similarly calculates the red and blue components, thus yielding a color preview image. In the approach described above, binary masks were first applied to select the reliable subpixels and then a weighted average of reliable subpixels was calculated. In an alternate approach, the masks themselves can be weighted rather than binary, thus implementing both the selection of reliable subpixels and the weighted averaging. In other embodiments, the processing module can calculate the median values of the reliable subpixels.

In one embodiment, the processing is performed on vectorized versions of the superpixels. Referring to FIG. 7, the superpixel has a diameter of 13 subpixels. If you include the corners outside the circle, there are a total of 13×13=169 subpixels per superpixel. The 13×13 array of subpixels can be unfolded into a 1×169 row vector. Assume there is a 100×100 array of superpixels, each of which can be unfolded into a 1×169 row vector. These 10,000 row vectors can be stacked to produce a 10,000×169 matrix representation of the plenoptic image. The binary masks can be similarly folded. The masking can be performed as matrix manipulations to obtain a 10,000×1 column vector that represents the preview image. This can then be folded back to the original 100×100 shape.

The color examples given above used red, green and blue components. In alternate embodiments, the color previews can be based on other image data determined from the plenoptic image. For example, the system may determine a brightness, chrominance, luminance, hue, etc. and generate masks, reliable subpixels and/or preview images for these values.

The processing module 190 can store different masks for future use by the plenoptic imaging system. For example, if preview masks are generated in a calibration process, the plenoptic imaging system may store those masks locally and then use them to process captured plenoptic images. The masks can be stored on a memory storage unit of the plenoptic imaging system (e.g. a solid state memory). In other embodiments, the masks can be stored on a memory system accessible by the plenoptic imaging system (e.g. a coupled computer system). Similarly, the plenoptic imaging system can store information associated with the color preview generation including the centroid locations, the calculated pixel values for any pixel of the calibration image, a threshold value, the size and shape of different windows, etc.

In some cases, the plenoptic imaging system is capturing video. That is, plenoptic images are captured at video rate. Preferably, the plenoptic imaging system captures raw plenoptic images, processes the views, and creates a preview image such that the preview images are created at the same frame rate as the capture of the plenoptic video. If the imaging system is capturing 15 or more frames per second, then the processing module has 66 ms or less to create the preview image for real-time operation. The preview images provide a real-time preview of what the plenoptic imaging system is capturing.

For a plenoptic otoscope, the real-time video allows the physician to guide the otoscope to capture images of the eardrum or other relevant anatomical features. For example, a plenoptic imaging system used as an otoscope in a medical procedure may have the following specifications: a microlens size of 55 µm, a sensor array size of 3376×2704 pixels (i.e. 9 Mega pixels), an individual pixel size of 3.7 µm, and a frame rate for the preview video of 15-18 frames per second. These are just an example. Other embodiments may have different specifications.

Generally, the preview images (i.e. frames of the preview video) have a resolution that does not exceed the number of microlenses in the microlens array, which is significantly less than the total number of sensors in the sensor array. However, in some embodiments, various methods can be used to increase the resolution of the images above the number of microlenses in the array. Some examples include super-resolution, sub-sensor sampling, interpolation, resampling, box sampling, and vectorization.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. For a plenoptic imaging system comprising imaging optics, a microlens array and a sensor array, a method for generating a preview image of a plenoptic image captured by the plenoptic imaging system, the method comprising:
   accessing a plenoptic image of an object captured by the plenoptic imaging system, the plenoptic image comprising a plurality of superpixels, each superpixel comprising a plurality of subpixels;
   for each superpixel, selecting a set of reliable subpixels based at least in part on vignetting of the subpixels; and
   generating a preview image from the sets of reliable subpixels, the preview image comprising a plurality of pixels corresponding to the superpixels, wherein the preview image consists of one pixel per superpixel in the plenoptic image, each pixel generated from the set of reliable subpixels for the corresponding superpixel, and wherein generating the preview image comprises:
   unfolding each superpixel into a one-dimensional array of subpixel values;
   applying binary masks to the one-dimensional arrays of subpixel values, the binary masks defining the sets of reliable subpixels;
   averaging the one-dimensional arrays of masked subpixels; and
   folding the averages into a two-dimensional shape of the preview image.

2. The method of claim 1 wherein each pixel is generated based on a weighted average of the set of reliable subpixels for the corresponding superpixel.

3. The method of claim 1 wherein, for each superpixel, selecting the set of reliable subpixels comprises:
   determining a centroid for the superpixel; and selecting only subpixels that fall within a window positioned at the centroid.

4. The method of claim 3 wherein the window is symmetric and centered at the centroid.

5. The method of claim 3 wherein a size of the window is adjustable by a user of the plenoptic imaging system.

6. The method of claim 1 wherein, for each superpixel, selecting the set of reliable subpixels comprises:
selecting subpixels based on a value of the subpixel.

7. The method of claim 6 wherein selecting the set of reliable subpixels comprises:
selecting subpixels with a value that is above a threshold value.

8. The method of claim 7 wherein the threshold value is adjustable by a user of the plenoptic imaging system.

9. The method of claim 1 wherein the subpixels comprise different color subpixels; the preview image is a color preview image that includes different color components; and each color component is generated from the reliable subpixels of the same color.

10. The method of claim 1 wherein the plenoptic imaging system captures plenoptic video comprising frames of plenoptic images, and the preview images provide a real-time preview of what the plenoptic imaging system is capturing.

11. For a plenoptic imaging system comprising imaging optics, a microlens array and a sensor array, a method for generating a preview image of a plenoptic image captured by the plenoptic imaging system, the method comprising:
accessing a plenoptic image of an object captured by the plenoptic imaging system, the plenoptic image comprising a plurality of superpixels, each superpixel comprising a plurality of subpixels;
for each superpixel, selecting a set of reliable subpixels based at least in part on vignetting of the subpixels wherein selecting the set of reliable subpixels comprises:
applying a mask to the subpixels in the superpixel, wherein the mask is determined as part of a calibration process for the plenoptic imaging system, and selecting the set of reliable subpixels further comprises retrieving the mask from a memory of the plenoptic imaging system; and
generating a preview image from the sets of reliable subpixels, the preview image comprising a plurality of pixels corresponding to the superpixels, each pixel generated from the set of reliable subpixels for the corresponding superpixel.

12. The method of claim 11 wherein the preview image consists of one pixel per superpixel in the plenoptic image.

13. The method of claim 11 wherein, for each superpixel, selecting the set of reliable subpixels comprises:
selecting subpixels based on a value of the subpixel.

14. The method of claim 11 wherein selecting the set of reliable subpixels comprises:
selecting subpixels with a value that is above a threshold value.

15. The method of claim 11 wherein, for each superpixel, selecting the set of reliable subpixels comprises:
determining a centroid for the superpixel; and
selecting only subpixels that fall within a window positioned at the centroid.

16. For a plenoptic imaging system comprising imaging optics, a microlens array and a sensor array, a method for generating a preview image of a plenoptic image captured by the plenoptic imaging system, the method comprising:
accessing a plenoptic image of an object captured by the plenoptic imaging system, the plenoptic image comprising a plurality of superpixels, each superpixel comprising a plurality of subpixels;
for each superpixel, selecting a set of reliable subpixels based at least in part on vignetting of the subpixels wherein selecting the set of reliable subpixels comprises:
selecting a first group of subpixels according to a first criteria;
selecting a second group of subpixels according to a second criteria; and
including in the set of reliable subpixels only those subpixels that are in both the first and second groups; and
generating a preview image from the sets of reliable subpixels, the preview image comprising a plurality of pixels corresponding to the superpixels, each pixel generated from the set of reliable subpixels for the corresponding superpixel.

17. The method of claim 16 further comprising:
generating a first binary mask defined by the subpixels in the first group;
generating a second binary mask defined by the subpixels in the second group; and
applying the first and second binary masks to the subpixels in the superpixel.

18. The method of claim 17 wherein:
the first group consists of only those subpixels that fall within a window positioned at a centroid of the superpixel; and
the second group consists of only those subpixels with a value that is above a threshold value.

19. The method of claim 16 wherein the preview image consists of one pixel per superpixel in the plenoptic image.

20. The method of claim 16 wherein, for each superpixel, selecting the set of reliable subpixels comprises:
selecting subpixels based on a value of the subpixel.

* * * * *